June 28, 1966  O. J. MUNZ  3,258,766
THREE-DIMENSIONAL TELE-GLYPH VIDEO SYSTEM
Filed Feb. 11, 1957  7 Sheets-Sheet 1

FIG. 1

INVENTOR
Otto John Munz

INVENTOR
Otto John Munz

INVENTOR.

Otto John Munz.

United States Patent Office 3,258,766
Patented June 28, 1966

3,258,766
THREE-DIMENSIONAL TELE-GLYPH
VIDEO SYSTEM
Otto John Munz, Harness Creek, Annapolis, Md.
Filed Feb. 11, 1957, Ser. No. 639,349
39 Claims. (Cl. 343—5)

The present invention pertains to a three-dimensional tele-glyph video system.

This is a continuation-in-part of applicant's application for: Linear Motor Control, filed Jan. 23, 1956, Serial No. 560,847, now U.S. Patent No. 2,911,538, issued Nov. 3, 1959, and application Serial No. 562,134, filed Jan. 30, 1956 for Three Dimensional Drawing and Data Recording Systems.

Up to the present, radar and television displays and representations operate in a single plane, usually identified by the viewing screen of a cathode-ray-tube.

An object of the invention is to provide a true three-dimensional counterpart to a cathode-ray-tube screen.

Another object of the invention is to provide a three-dimensional counterpart to a cathode ray tube screen, employing applicant's linear movement electric motor control described in his U.S. Patent No. 2,911,538 to cause a levitating body to move in a defined space in a three-coordinate system in substantially linear paths, a sequence of linear paths, a curved or tortuous path, a path closed upon itself or universally, whereby means are included for visual display of the levitating body.

Another object of the invention is to provide an apparatus for three-dimensional indication of movement of a body, such as a plane, relative to a frame of references, such as a fixed terrain situation of an airport runway, by causing a miniature body representing the plane to move correspondingly within a container, representing the terrain.

Another object of the invention is to provide a moving display of three-dimensional phenomena in a three-dimensional matrix, by scanning the space in two planes, by resolving the results into three signal-outputs, one along each coordinate axis, and by feeding each signal to cause proportional movements of a levitating body in one coordinate axis within the matrix.

Another object of the invention is to combine a conventional scanning system such as a directional radar system with a matrix, and with an electric motor control of linear movements of a levitating body to cause said body to duplicate proportionally within said matrix the movements of a scanned object and to produce thereby a true three-dimensional display.

Yet another object of the invention is to provide methods and apparatus for the production of a glyph, diaglyph, glyph-record, teleglyph and similar displays, as a three-dimensional counterpart to a graph, diagram, graphical record or television, respectively.

Another object of the present invention is to provide a method of and apparatus for display of information such as values of mathematical functions or relative positions of physical objects in a transient form in three dimensions by the positioning of a stylus relative to three orthogonal reference axes.

Still another object of the present invention is to provide a method for continuous glyph-recording of information in a transient form in three dimensions by a stylus leaving traces of its movements in a glyph record carrier for instance within a transparent container.

Another object of the invention is to provide novel apparatus, methods and operating means for the production of three-dimensional transient recordings which utilize a recording assembly including a matrix-housing therefor, a recording carrier and a recording stylus universally movable therein, responsive to actuating means from devices for the sensing of phenomena and which apparatus and method operation is capable of providing a record in three dimensions, which optionally may be related to a frame of references to determine the quantitative and qualitative characteristics of the phenomena sensed.

A further object of the invention is to provide novel recording means, either manually controllable or controllable through the employment of magnetic, electromagnetic or electro-static forces to produce controlled levitating movements of a stylus.

Another object of the invention is to provide an assembly, including a matrix and a stylus movable therein, said matrix charged with a suitable carrier and said stylus equipped with glyph forming means, and means to move the stylus controllably within the matrix and to release its glyph forming means in its path to produce in cooperation with said carrier a fluorescent, phosphorescent or otherwise visible trace.

Another object of the invention is the provision of a transparent matrix charged with a transparent carrier and including at least one universally movable stylus equipped with glyph forming means.

Another object of the present invention is to provide a method and apparatus for suspending and for moving at least one body relative to and within a space determined by and limited to a volume between electromagnetic coils or electro-static plates in which the fields effectively provide controllable stabilizing and/or positioning forces on said body in one, two or three dimensions.

Another object of the present invention is to provide a method of and apparatus for display of information presented by the moving bodies, such as values of mathematical functions or relative positions of physical objects in a transient form in three dimensions.

Still another object of the present invention is to provide a method for continuous glyph-recording of information in a transient form in three dimensions by a stylus leaving traces of its movements within a transparent container.

Other and further objects will become apparent from the more detailed description and the drawings which are set forth in the application, it being understood that such further description and illustration is not limiting, since various changes may be made in the structures, methods and apparatus of the present invention by those skilled in the art without departing from the spirit and scope of the present invention.

The nature of the invention will be apparent from the following disclosure taken in conjunction with the accompanying drawing, and claims.

The invention employs a linear movement electric motor system having means causing at least one levitating body to move in a defined space in a three-coordinate system in substantially linear paths, a sequence of linear paths, a curved or tortuous path, a path closed upon itself, or universally.

In the drawings:

FIGURE 1 illustrates a system for three-dimensional visual display of a moving object relative to a topography or other space coordinates as determined by electrical signals in three independent axes resulting from a radar, electro-optical-television scanner or any other equivalent device.

For the purposes of this invention a glyph is a three-dimensional configuration produced within a matrix representing in three-dimensional proportions three-dimensional relationships.

A true three-dimensional display because of lack of definition in the radar art, for the purposes of this patent application, has been named "glyph." This word is derived from the Greek word "glypho" meaning "to carve." An antecedent word using this term is "hieroglyph" meaning a three-dimensional carved body representing a word, an idea, a sound, or a picture. Whenever used here in connection with the radar art, it is to represent a transient three-dimensional display.

Figure 1:
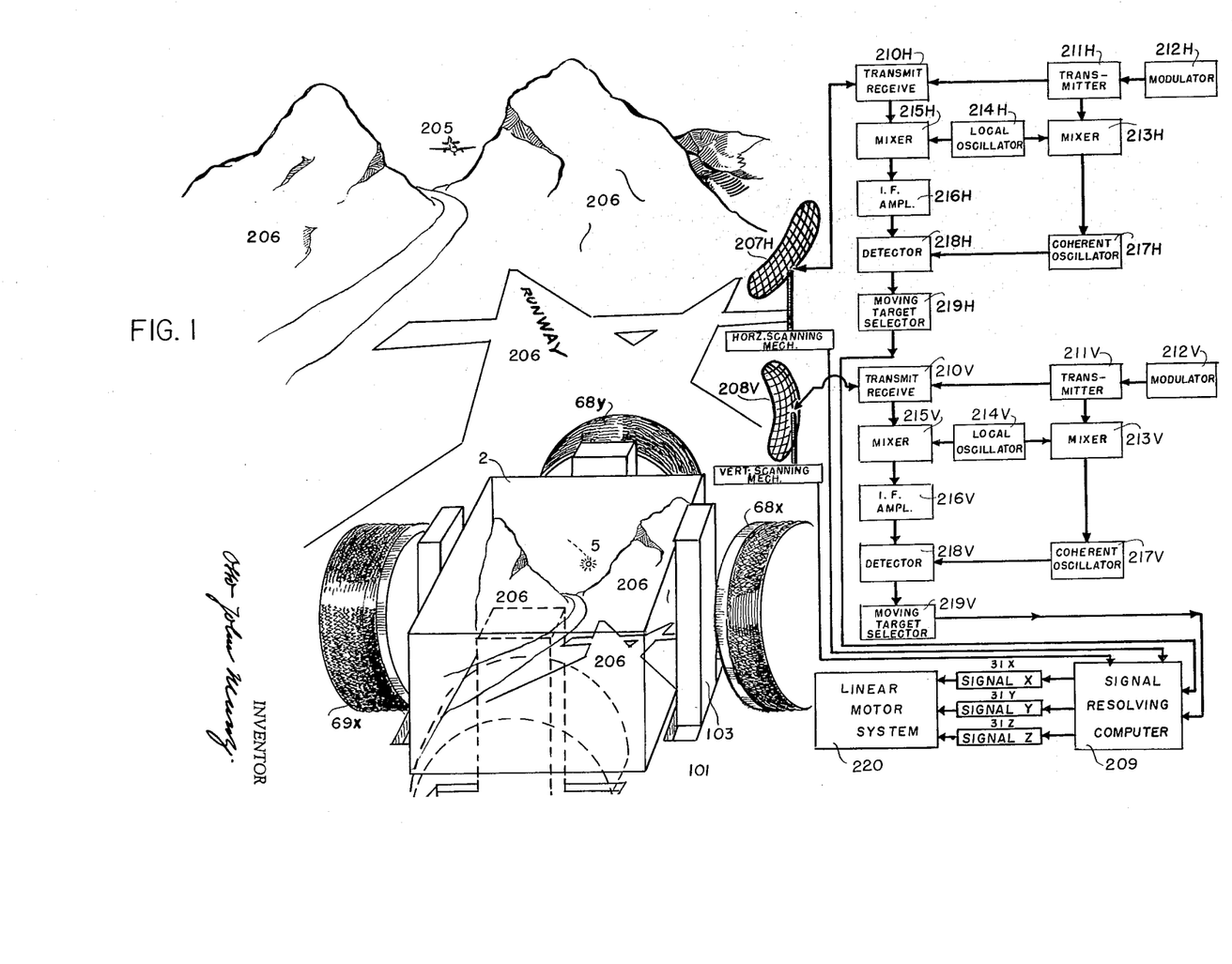
FIGURE 1 of the drawing combines a schematic diagram of a circuitry with a perspective view of novel elements, and with a terrain background to illustrate the basic principles of the teleglyph display of the present invention.

The usefulness of this system is demonstrated in FIGURE 1 with reference to a stationary radar glyph scanner to be used with a ground controlled navigation system. Under conditions of low visibility the present apparatus is useful with an airport runway approach control system to display to a control operator the approaching plane with respect to the position and location of the surrounding topography in actual three dimensions.

The transparent glyph container in such an instance will have a three-dimensional simulation of the topography preinserted in the container and the stylus will represent the approaching plane.

FIGURE 1 includes a diagrammatic representation of a radar-tele-glyph video system as applied to the specific embodiment of an indicator for an airport runway approach control system employing radar moving target detection means and linear motor stylus control means, the latter described in copending patent application Ser. No. 560,847, filed January 23, 1956, now U.S. Patent No. 2,911,538 of November 3, 1959.

In FIGURE 1 a perspective view of an airport runway is shown with background topography 206 and with an approaching airplane 205. Two antenna-reflectors, each scanning in a plane intersecting the scanning plane of the other, one 207, scanning preferably horizontally and the other 208, scanning preferably vertically are shown with a conventional radar, horizontal, 207H, 210H through 219H, and vertical, 208V, 210V through 219V in block diagram. To simplify the comprehension of the invention in the tele-glyph system shown a computer 209 resolves the polar coordinates of the conventional radar system into Cartesian coordinate signals. A glyph stylus 5 within container 2 represents the airplane 205 and the dotted path of the stylus may indicate the path of the plane up to the point at which the stylus is at a particular moment. The topography 206 also may be shown reproduced to scale within the container for reference purposes by a system, such as shown in U.S. Patent No. 2,775,758. A radar system shown in this patent in FIGURE 2 may be employed, one for a vertical scan, and one for a horizontal scan. Another radar scanning system suitable for this purpose is described in U.S. Patent No. 2,555,101 of May 29, 1951, to L. W. Alvarez et al. beginning with column 8, second paragraph.

In the radar system there is employed a vertical scanning antenna 208V with circuitry annotated after each number by a V and a horizontal scanning antenna 207H with associated circuitry having an annotation after each reference number as H. The circuitries of both antennas are the same and thereafter will be discussed as one. Each system employs a linear logarithmic receiver comprising a modulator 212, which modulates the transmitter 211, to provide radar frequency pulses through transmit-receive switch 210 to the antenna 207. The radar echo is connected to the input of the receiver hereinafter described by means of the transmit-receive switch 210, which serves to alternate the antenna connections for the transmitting and receiving intervals. The receiver comprises the conventional sequence of a mixer 215, an intermediate frequency amplifier 216 and a detector 218. The output of a local oscillator 214, which is used in the first mixer stage 215 of the receiver is also mixed with a portion of the transmitted pulse in mixer 213. The resulting intermediate frequency is applied to a coherent oscillator 217, the output of which consists of continuous reference oscillations synchronized to the transmitted pulses, and is fed as an input to detector 218. To derive signals from the radar system responsive to the moving targets only, the output of the detector is connected to a moving target selector 219. The selector is capable of comparing the relative amplitudes of successively received pulses, to eliminate those of unchanged amplitudes, in order to discriminate between the significant moving target pulse echoes and pulses received from the fixed background, and to eliminate the latter, as described for instance in U.S. Patent No. 2,678,439, col. 6, lines 16 to 25.

The signals resulting from the two moving target selectors in combination with the angular antenna position information provided from the horizontal and vertical scanning mechanisms 208H and V define the position of the tracked moving object 5 in space in polar coordinates, given by the angles of scan of each of the two antennas and by the range as determined from the time or phase lag of the echo pulse relative to the transmitted pulse. The antenna position signal from the horizontal and vertical scanning mechanisms 207 and 208 their respective parts and signal resolving computation are described in U.S. Patent No. 2,555,101 of May 29, 1951.

The signal resolving computer 209 accomplishes the range calculation and, in combination with the antenna angles as inputs resolves the polar coordinate information into three Cartesian coordinate signals, 31X, 31Y and 31Z. These three signals are fed into the linear motor system described in the copending application Serial Number 560,847, filed January 23, 1956, now U.S. Patent No. 2,911,538, as inputs.

The signal resolving computer is a conventional device having sine and cosine potentiometers on the elevation and azimuth inputs, the outputs of which are multiplied electrically by range with conventional computer multiplication elements. The outputs are the Cartesian coordinates of the moving object relative to the radar antennas as the zero point. Computer 209 is a device conventional to the prior art, particularly of gun-fire control and has been described, for instance, in U.S. Patent No. 2,648,838 of August 11, 1953, column 2 line 31 through column 3 line 33. Means to convert polar coordinate signals into Cartesian coordinate signals are also conventional and described, for instance in U.S. Patents No. 2,510,384, dated June 2, 1950 and No. 2,648,838 dated August 14, 1953.

This system is equally applicable to sonar tracking, to tail radar, etc.

An optical transient or permanent glyph representation by various methods and means such as disclosed in applicant's copending patent application Ser. No. 562,134 filed November 5, 1956 for Three Dimensional Drawing and Data Recording Systems, and Ser. No. 560,847, now U.S. Patent 2,911,538 of Nov. 9, 1959, may be created.

FIGURES 2 and 7 to 14 incl. of the present application correspond to and are described in greater detail with reference to FIGURES 5a, 6, 2, 2a, 3, 4, 5, 7 and 8, respectively, of the above U.S. Patent 2,911,538.

Figure 15:
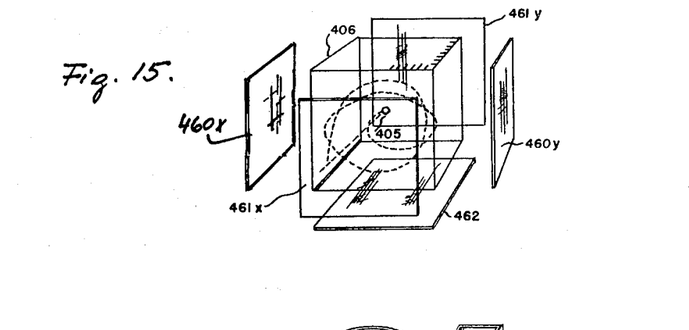
FIGURE 15 is a perspective view of an apparatus of the invention employing alternating force fields for levitation of a stylus.

In FIGURE 15 a matrix 406 is shown positioned within two pairs of magnets, of electromagnets, of electrostatic plates, or of electrical coils in the $x$ and $y$ axes, 460, 461 above a single magnet, electro-magnet, coil, or electro-static plate 462 in the $z$ axis. A levitating stylus 405 comprising magnetically permeable, conductive, or dielectric material, respectively, or a magnet or electret, or at least one short circuited electro-conductive coil, or other material moving in response to outside controls is moved within the matrix by magnetic, electro-magnetic, electro-static or other radiations in a system, such as described in the above cited copending patent application on linear motor systems.

Thus levitating type styli, leaving traces of their movements may be employed to produce a transient glyph trace.

All these styli have the following features in common: means responsive to the magnetic or other forces, such as described above, which are to control their movements, such as permeable or electro-conductive bodies, magnets or electrets.

The levitation of the stylus itself may be obtained by electro-magnetic radiations, or by imparting to the stylus a neutral buoyancy in a liquid carrier, or by suspending it in a carrier, the shear resistance of which is greater than the gravitational pull exercised upon the stylus. Vertical movement control of the buoyant stylus may be exercised also by pressure variations of the carrier in a pressurized matrix using the Cartesian diver principle.

The matrix may have any desirable shape, such as a polyhedron, prism, pyramid, cone, plinth, double curved or warped surface, or cylinder.

The styli may be a physical body, dust particles, pigments, permeable or magnetic particles, inks, paints, or any other substance capable of leaving a visible trace.

The glyph traces are introduced into a matrix by any conventional method or for instance by using a colloidal suspension of fine ferro-magnetic or high-dielectric particles for instance in a silicone oil and by subjecting the suspension to magnetic or electric fields.

In a preferred embodiment the recording container may be under a vacuum or filled with a transparent liquid charged with radioactive materials, or filled with a phosphorescent or luminescent gas reacting with a stylus moving within it, made of or coated with selected materials, heated by induction and levitating under electro-magnetic or static influences.

An optically transient glyph representation may be produced by the methods of the preesent invention within a transparent matrix with a levitating stylus. A field-force responsive leviating stylus 5, is positioned within two pairs of radiation generators, such as of magnets, of electro-magnets, of electrostatic plates, or of electrical coils in the two horizontal axes above a single magnet, electro-magnet, coil or electrostatic plate in the vertical axis.

The field-force responsive levitating stylus 5, comprises material responsive to selected radiation generators, such as a magnetically permeable, conductive, or dielectric material, or a magnet or an electro-magnet or at least one short-circuited coil, or any other material movable in response to the linear motor controls described in applicant's concurrent Patent No. 2,911,538. The stylus may be a substantial body or mechanism, or the stylus may be a minute particle of a diameter of a few angstroms such as 1,000 angstroms, more or less, to approximate an artifical molecule. It still must have the physical capability of being oriented in a force-field and of moving in the matrix container evacuated or filled with a gas or liquid, without excessive friction.

Optionally the stylus may have light reflecting or light-, luminescence- or phosphorescence producing properties. In the linear motor system the stylus will be only little heated by the currents moving it. Its heat, however, may be controlled to glow by increasing or decreasing the strength of the field. For any level of the field the position of the stylus is not dependent on the strength of the field but on the balance of the two fields as controlled by the amplifier, which controls the field in response to the positioning signal. An example of such an amplifier is described in the above Patent Number 2,911,538 with reference to its FIGURE 2, reference numeral 37 as a phase sensitive amplifier. Unless heating of the stylus should be desired, or for some other specific purposes, a field of only such a strength will be produced which will give the stylus the desired speed of response. Means for fixed leviation of a body and its heating are described in the Journal of Applied Physics, volume 23, No. 5, of May 1952, pages 545 through 552.

The glow of the heated stylus also may be controlled by the selection of materials. Some materials, such as carbon or tungsten will glow before reaching the melting stage, and may form a portion of the stylus body. A separate source may be employed for illuminating the stylus.

The stylus may be coated with a directly phosphorescent or luminescent material, or with a material which will phosphoresce or luminesce by reacting with a selected glyph carrier. Either the stylus, or the transparent liquid of the container may comprise radioactive materials. In the copending above cited patent application on Linear Motor system, a follow-up mechanism is demonstrated and shown there in FIGURES 5 and 5a, which keeps the moving stylus illuminated by an outside source of light for tracking purposes. This source of light may be optionally X-rays, an electron gun, ultra-violet or other radiations, shown in FIG. 3 as R which will cause illumination of a stylus cooperatively coated.

The stylus may be coated with barium salt, for instance, having as the optical follow-up light source, X-rays. The apparatus, provided with a switch, turning on and off the X-rays in response to phenomena will make the stylus radiate as long as the stylus is in its correct path and the switch is on. Preselected variable light effects may be radiated by the levitating stylus in response to variable phenomena, for example, to warn the pilot in time to prevent collision.

A levitating stylus coated with a polynuclear aromatic hydrocarbon will emit light when exposed to an ionizing radiation in a liquid carrier containing a liquid hydrocarbon solvent. This is described in U.S. Patent No. 2,698,906.

A levitating stylus coated with a fluorescent material such as zinc silicate will luminesce in a transparent evacuated matrix containing a mixture of rare gases, such as neon, argon, hydrogen sulphide or krypton, a small globule of mercury and phosphor in powdered form. See U.S. Patent No. 2,449,880.

Figures 5, 6:
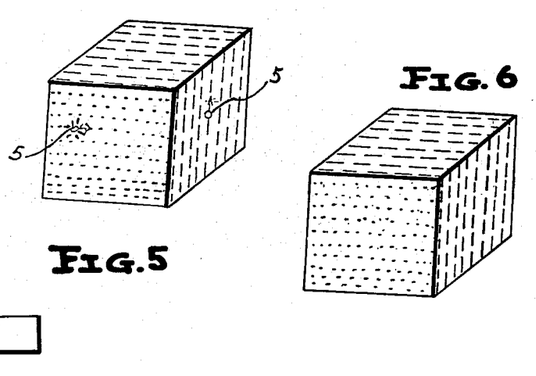
FIGURE 5 is a perspective view of the container of FIGURES 1, 2, 3 or 4, showing a single stylus levitatingly travelling in a sequence of linear paths, equipped with means for illumination.
FIGURE 6 is a perspective view of the container of FIGURES 1–4, showing a plurality of styli levitatingly spaced within the container 2, each stylus equipped for illumination.

Other materials are known to the art, such as organic fluorescent dyes and fluorescent pigments, which will emit light in response to fluorescigenious radiations, which may be employed for the purposes of this invention as a stylus coating, or a portion of it, to produce a transient trace by a levitating stylus either alone or by reaction with a cooperative glyph carrier containing material complementary to such a reaction, or which will respond to a suitable radiation directed upon the stylus for instance, from the follow-up system described in the above cited copending patent application on Linear Motor system and shown there in FIGURES 5 and 5a in detail. A ball type contractible stylus, having orifices prefilled with a fluid trace-material, will contract on pressure caused by its movements through a gelatinous transparent liquid to expell the material gradually as a trace of its path.

Figure 7:
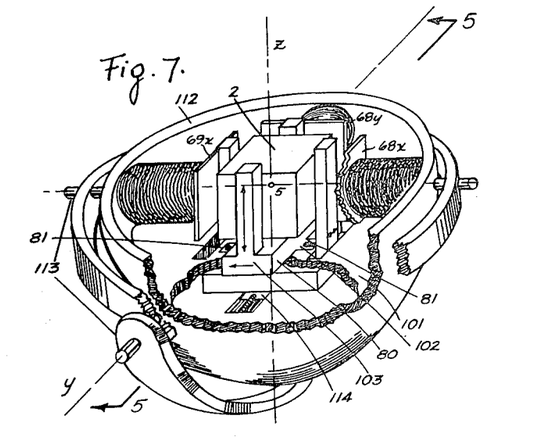
FIGURE 7 is a perspective view of an instrument panel-three-dimensional television combination, having an inspection window from the top, with portions broken off.
Figure 8:
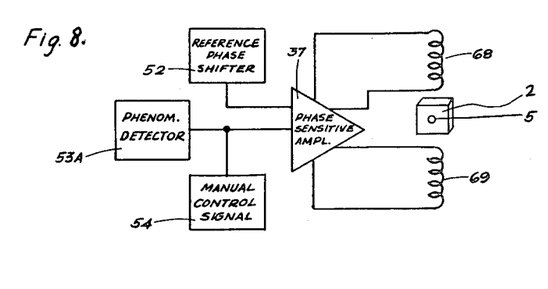
FIGURE 8 is a schematic circuit diagram of a non-follow-up stylus control circuit.
Figure 9:
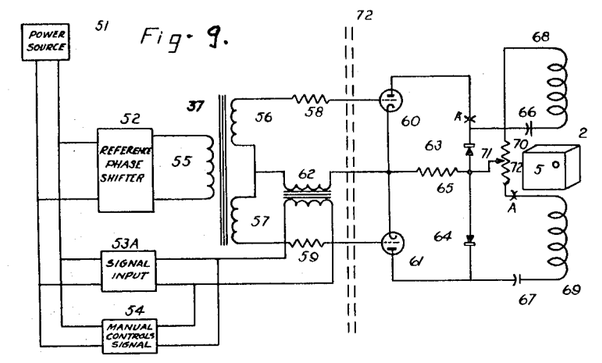
FIGURE 9 is a schematic circuit diagram of one amplifier feeding two opposed coil-fields for one representative axis of the stylus movements within the apparatus shown in FIGURE 7.
Figure 10:
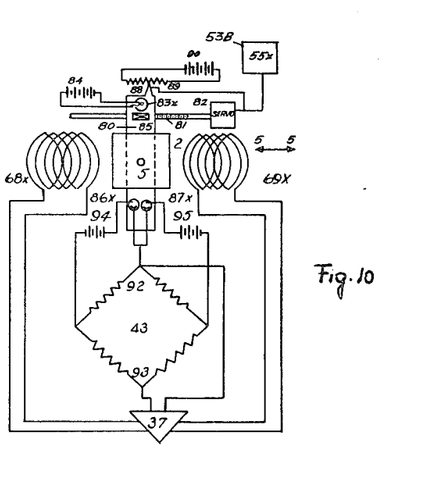
FIGURE 10 is a schematic diagram of an optional stylus position control circuit of the apparatus shown in FIGURE 7.
Figure 11:
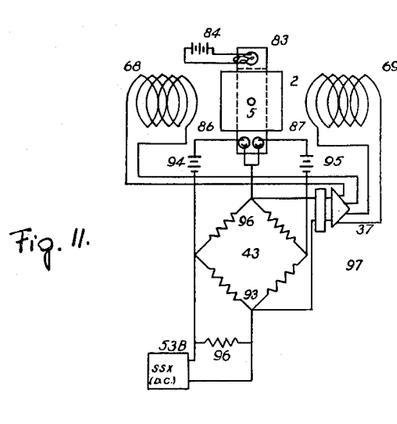
FIGURE 11 is a schematic diagram of an optional all-electronic alternative embodiment of a stylus position control circuit of the apparatus shown in FIGURE 7.
Figure 12:
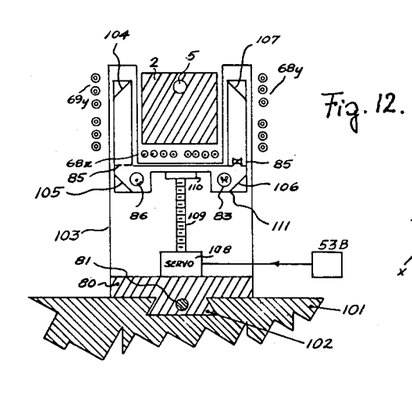
FIGURE 12 is a vertical cross-section through container, stylus and apparatus along lines 5—5 of FIGURE 7.
Figure 13:
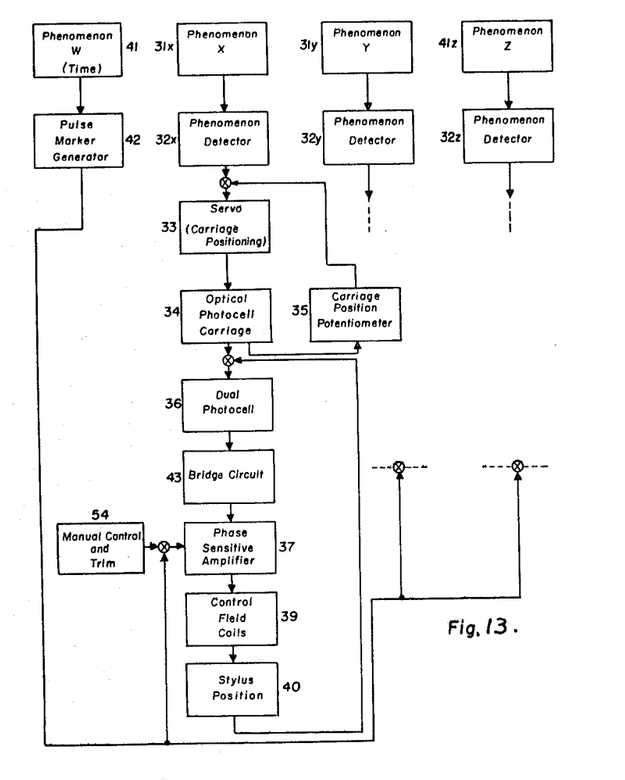
FIGURE 13 is a block diagram of an optional method and apparatus described in FIGS. 8, 10, 12 and 7.
Figure 14:
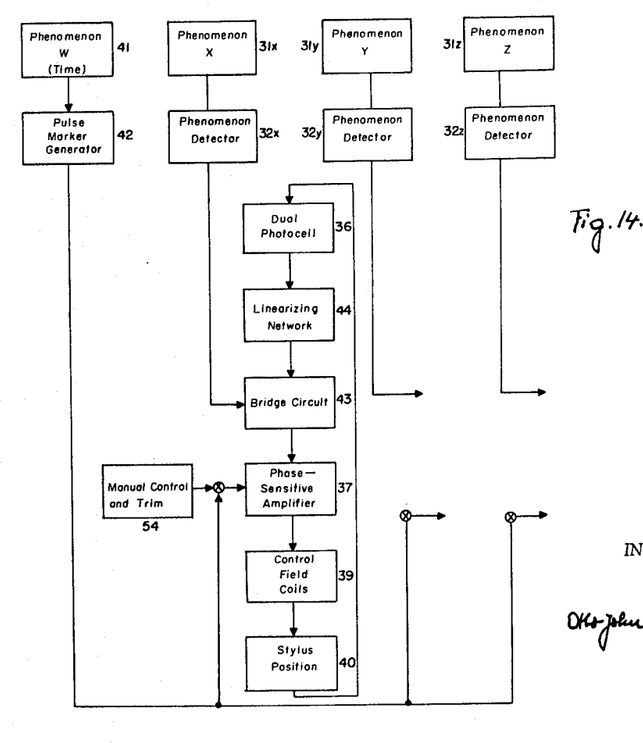
FIGURE 14 is a block diagram of an alternative method and apparatus of FIGURES 8 and 11.

A ball-type stylus immersed in a matrix charged with a transparent damping liquid and provided with the above discussed means to show the movements of the stylus or its path in a luminescent or phosphorescent manner may serve as a three-dimentional indicator or transient phenomena, for instance on an air plane instrument panel, in a novel three-dimentional television representation. The instrument of FIGURE 7 shown without a top coil provides an inspection opening. It may serve as a device for three-dimensional display of the relative positions of one or more styli with respect to a fixed container, or relative to a space defined by the coils or electrostatic plates 460x, 460y, 461x, 461y, and 462 of FIGURE 15 in a three-dimensional configuration.

When the apparatus is constructed as a portion of an airplane instrument panel, the stylus itself may represent to the pilot the airplane he is piloting, and the container may be provided with a reference system. The bottom of the container may simultaneously function as an optical screen represenation of the passing terrain. A conventional altimeter may provide additional impulses to the linear motor control means.

Figure 2:
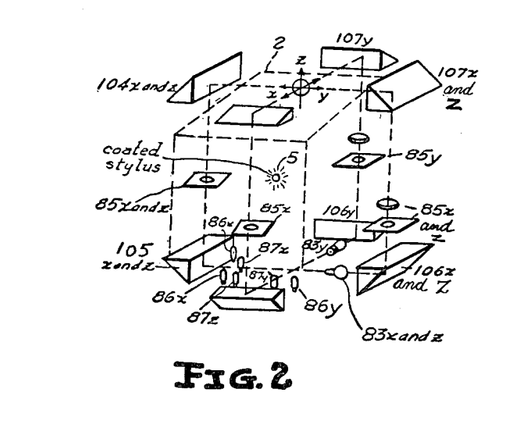
FIGURE 2 is a perspective view of the container 2 of FIGURE 1 showing electro-optical means for illumination of the coated stylus 5 of FIGURE 1.

In FIGURE 2 the tele-video system of FIGURE 1 is demonstrated with optical illumination of a stylus coated for light-reflection.

Figure 3:
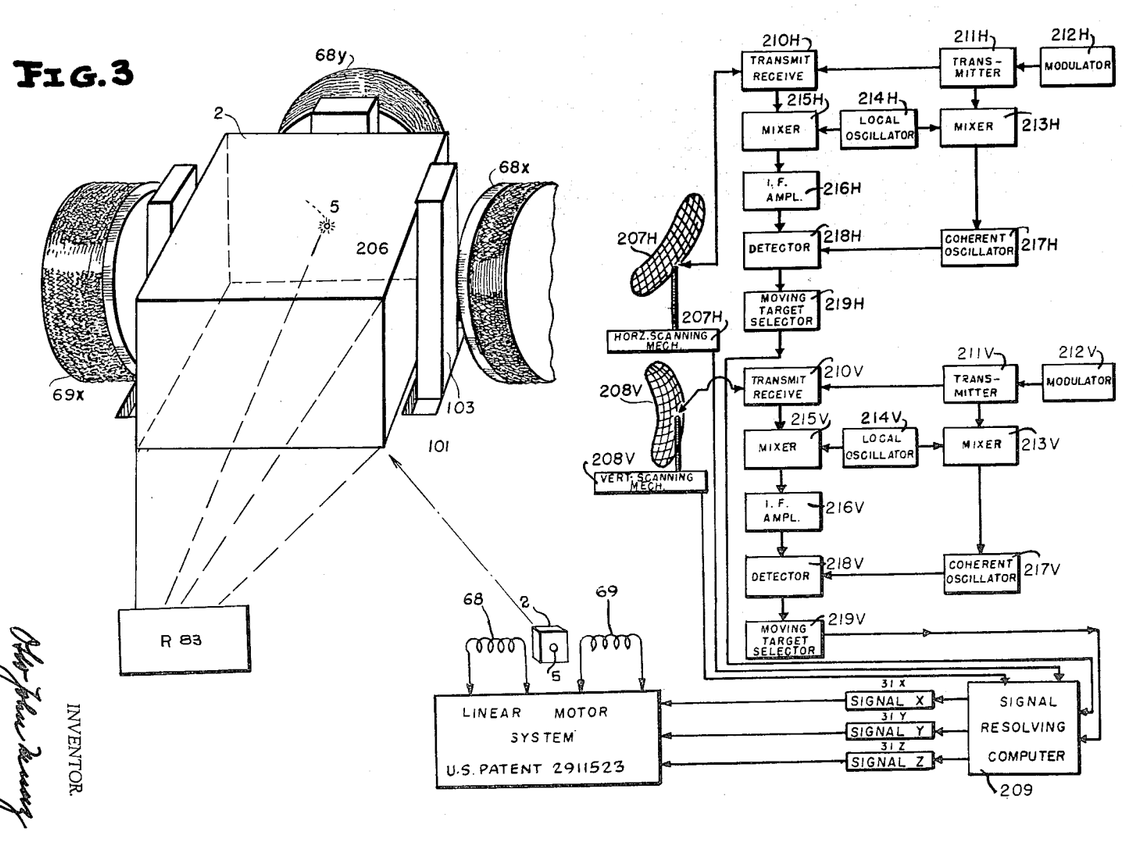
FIGURE 3 is a perspective view similar to that of FIGURE 1, showing electron gun means for illumination of a coated stylus 5 of FIGURE 1.

In FIGURE 3 the means for illumination of the stylus coated same as a TV screen for radiation on impingement of electrons are represented by an electron gun such as employed in a CRT. This illumination may be constant and simply illuminate the moving stylus by high velocity impingements of electrons continuously or it may be variable in response to the outputs of scanners 207 and follow the stylus.

The electron gun is shown connected to the scanners 207 and 208.

Figure 4:
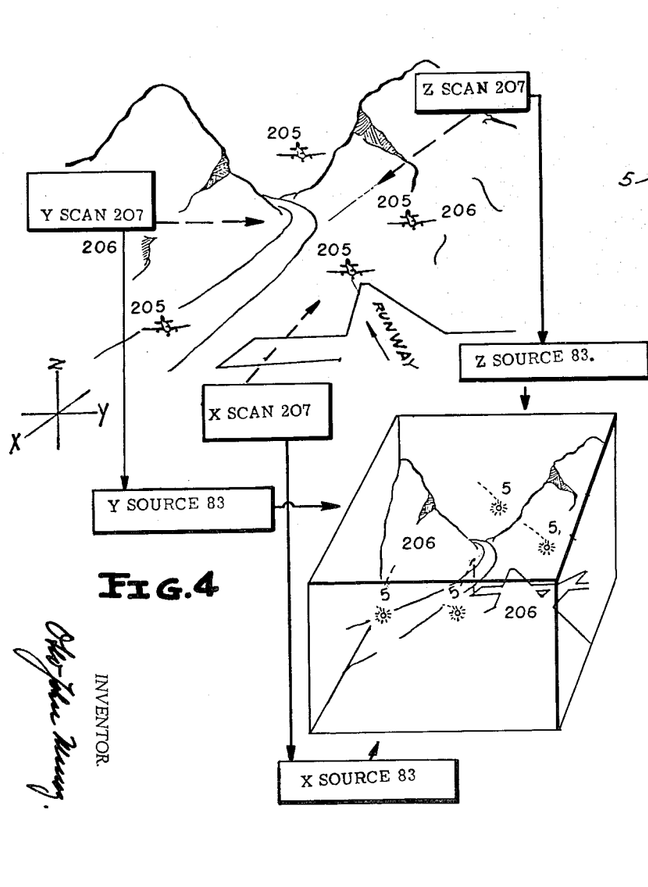
FIGURE 4 is a view partly in perspective and partly diagrammatical similar to that of FIGURE 1 showing an array of scaning means 207 and a plurality of means to cause illumination of at least one stylus within container 2.

In FIGURE 4, a panoramic and viewing situation is shown similar to that of FIGURE 1. Instead of one airplane 205 of FIGURE 1 a plurality of such planes spaced in the air is shown. Instead of one scanner 207 an array of three TV cameras spaced and scanning in the x, y, and z directions, respectively, are shown. Two or more than three scanners are equally feasible of course.

The array of TV scanners 207 is duplicated by an array of electron guns 83 spaced around the three-dimensional tele-video container 2 in the same proportions as the scanners 207 are spaced for scanning the spatial topography 206. Each scanner transmits to its respective electron gun.

The container of FIGURE 3 is shown with a single stylus as demonstrated in FIGURE 5 and the container of FIGURE 4 is shown with a plurality of uniformly dispersed particles as demonstrated in FIGURE 6. In both instances means for giving off light are provided. When a plurality of particles is employed in the embodiment shown in FIG. 4, only the styli 5 which are luminating are visible and shown. The single stylus travels within the container at great velocity in a sequence of linear paths as discussed in applicant's concurrent Patent No. 2,911,538. This is shown in FIGURE 5, where the stylus direction of travel in the container 2 is indicated in a sequence of planes by an arrow. In FIGURE 6 the plurality of levitating styli spaced or dispersed within the container is shown. In either instance at least one source 83 of radiation such as an electron gun will cast its radiation on the stylus or styli correspondingly coated to radiate and a true three-dimensional optical transient televideo picture is produced.

The picture is in orthogonal coordinates as shown by example, if the scanners and corresponding electron guns are positioned for scanning and radiation, respectively, in an orthogonal array. The levitating stylus, one or a plurality of sytli, may be exposed to any other or addtional extraneous force, to show optically the effect of such a force.

While only a fixed terrain situation is shown in the drawings, a moving terrain may be included, for instance by utilizing the bottom of the container, or the side wall, opposite to the viewing wall as reference using it as a screen of a cathode-day-tube, the gun thereof being spaced on the outside of the container or the projection screen of an optical system, a moving map, etc. In such cases the apparatus providing the background reference operates from outside of the glyph-matrix.

The system is shown operable by resolution to Cartesian coordinates.

A single stylus may be substituted by a plurality of styli. Or microdimensional bodies having light emissive properties when subject to an electron beam, ionizing or other type radiations, discussed above may instead be dispersed within the transparent carrier fluid of the stylus matrix. The electric linear motor controls and follow-ups in this instance may be substituted by cathode-ray guns or other electron emissive means cooperating with scanning means in a manner such as shown.

Styli may be kept suspended spaced in a container filled with a viscous carrier, for instance, under neutral buoyancy, or a carrier may be provided which as a shearing resistance to the weight of the styli.

Figure 16:
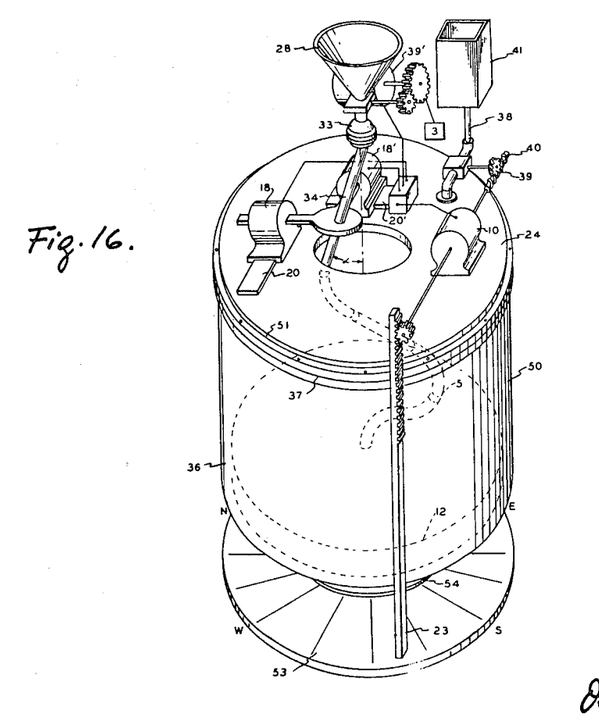
FIGURE 16 is an exploded perspective view of a container showing an opening in the top for introduction of glyph particles therein.

In some instances the viscosity of the glyph carrier preferably controls the positions of the styli. The viscosity of the glyph carriers may be selected simultaneously to function as a controllable damping medium and interference to the speed of the stylus movements. In FIG. 16 a cylindrical containment and observation space 50 is shown optionally provided with a transparent cylinder matrix 36. The glyph forming particles 5 are advanced from one or more funnels 28 through a valve system 39' controlled by an electric motor output 3 such as a synchro. A phenomenon detector provides electric input to the motor 3 which in turn will cause an opening or closing of the valve. The material 5 passes through a tube 34 the direction of which again may be controlled by servo motors 18 and 18' to direct a stream of the styli material through a central opening in the cover of the cylinder matrix.

The present specification describes examples of the invention for the purposes of the disclosure. It is however intended to cover all changes, modifications and combinations of the embodiments shown, and combinations of the present invention with those disclosed in the above cited copending patent applications.

With these and further objects in view, as may become apparent from the within disclosure, the invention consists not only in the method, apparatus and structure herein pointed out, but includes further methods, apparata and structures coming within the scope of what may be claimed.

I claim:

1. A tele-glyph video system comprising in combination radar scanning moving target detection means, a glyph matrix container, a glyph stylus within it, stylus movement means, control means for said stylus movements, means for transmitting impulses received from said radar means, to said control means for universal movements of said stylus within said container in response to the impulses of said radar scanning moving target detection means and means to cause said stylus to give off light.

2. A tele-glyph video system comprising in combination a container-matrix having at least one inspection window, a stylus responsive to force-fields within said container, radar scanning moving target detection means, including at least two antenna-reflector systems, each said system scanning in a plane intersecting the plane of the other and including means to produce a two-coordinate identification of the position of the said target, each said antenna-reflector system comprising moving target discriminating means, means to produce an output signal proportional to the said two-coordinate identification of the said target in the respective planes of each said antenna-reflector-system, means to produce signals relative to the angular antenna positions, a signal-resolving computer means to compute the output-signals of said two antenna-reflector systems and of the said angular antenna position informations, linear stylus movement control system for universal movements of said stylus within said glyph matrix container in response to variable signals and means to illuminate said stylus, and means to transmit said output-signals of said signal-resolving computer into said linear stylus movement control system to cause movements of said stylus corresponding to the movements of a moving target scanned.

3. A tele-glyph video system comprising in combination a radar scanning moving target detection means, a glyph recording system including at least a display-container and a stylus within said container, a linear motor stylus control means for causing movements of said stylus in Cartesian coordinates, said radar detection means including at least one horizontally scanning antenna-reflector means and at least one vertically scanning antenna-reflector means, a single-resolving computer means for resolution of polar coordinate signals of said antenna-reflectors into Cartesian coordinate signals, a linear logarithmic receiver with a modulator, one for each said antenna-reflector, selector means to discriminate between a scanned target and backgroud and to provide target position signals, one for each said antenna-reflector, angular antenna-position signaling means, one for each said antenna-reflector, means to transmit the outputs of said antenna-reflector angular position-signaling means of each said antenna-reflector and said target position signals of each said antenna-reflector into said signal-resolving computer means to cause said stylus to give off light and means to transmit said Cartisian coordinate signals from said resolving computer into said stylus movements control means to cause within said display-container movements of said stylus proportionally and correspondingly to the movements of said moving target.

4. In a three-dimensional tele-video system a radar scanning means, including means to produce variable electrical outputs, a transparent container filled with a transparent carrier fluid, a stylus suspended for universal levitation within said container by said electrical outputs, means to move said stylus controllably within said container, said fluid comprising a material transiently fluorescing in response to variable movements of said stylus within said fluid.

5. In a three-dimensional tele-video recording system a radar scanning means, including means to produce variable electrical outputs, a transparent container filled with a transparent carrier fluid, a stylus suspended for universal levitation within said container by said electrical outputs, means to move said stylus controllably within said container, said fluid comprising material transiently phosphorescing in response to variable electrical outputs of scanning means.

6. In a three-dimensional tele-video system a radar scanning means, including means to produce variable electrical outputs, a transparent container filled with a transparent carrier fluid, a stylus suspended for universal levitation within said container by said electrical outputs, means to move said stylus controllably within said container, said fluid comprising material transiently luminescing in response to movements of said stylus within said container.

7. In a three-dimensional tele-video system a radar scanning means, including means to produce variable electrical energy outputs, a transparents container filled with a transparent carrier fluid, said fluid comprising a stylis selected to produce transient wave radiations in response to variable electrical energy outputs of said scanning means.

8. A glyph recording three-dimensional video system comprising a glyph container, an electrical output source, a plurality of styli, at least one inspection window in said container and means to illuminate said styli in response to said electrical output source, said styli emitting light in response to radiations.

9. A glyph recording system as described in claim 8, wherein said styli are of a diameter in the vicinity of 1000 angstroms and are spaced within said container.

10. A glyph recording system comprising a container having at least one inspection window, at least one levitating stylus within said container, said stylus having means to give light in response to impingement by electrons, at least one scanning means, at least one means translating the scanning outputs into electrical energy means, and means to produce a controlled beam of electrons in response to the outputs of each said at least one scanning means.

11. A three-dimensional tele-video system comprising in combination an array of scanning means spaced for scanning a spatial sector in three coordinate axes, a plurality of transmitting and receiving means, one for each said scanning means, an array of electron guns, one for each said receiving means, and a glyph recording container, comprising minute particles of materials, light radiating in response to a charge from an electron gun, said array of said electron guns spaced relative to said glyph recording container for aiming charges of electron beams within it in the same directions and spatial proportions in which said array of said scanning means is spaced for scanning said spatial sector.

12. A three-dimensional video system comprising in combination: at least one stylus, including at least one material responsive to electric force-field means to levitate and including a radiating material to give off light in response to a cooperative excitation, electric force-field means generating force-fields to levitate said at least one stylus within a defined space, and excitation means to cause said stylus to give off light.

13. A three-dimensional video system comprising in combination: at least one stylus including at least one material responsive to electric force-field means to levitate said stylus including a material glowing on heating; electric force-field means to generate force-fields to levitate said at least one stylus within a defined space and to heat it to an intensity causing a glowing thereof.

14. A three-dimensional video system comprising in combination: at least one stylus including at least one material responsive to electric force-field means to leviate said stylus, said stylus provided with a radiating material causing it to give off light in response to a cooperative irradiation, electric force-field means to generate force-fields to levitate said at least one stylus within a defined space, and means to expose said stylus to irradiations causing it to give off light from said radiating material.

15. A three-dimensional video system comprising in combination: at least one stylus including at least one material responsive to electric force-field means to levitate said stylus, said stylus provided with a material having light-emissive properties when subjected to an electron impingement; electric force-field means to generate force-fields to levitate said at least one stylus within a defined space, and a source of electrons directing electrons on said at least one stylus.

16. A three-dimensional video system comprising in combination: at least one stylus including at least one material responsive to electric force-field means to levitate said stylus, said stylus provided with a material having light emissive properties when subjected to a source of ionizing radiation; electric force-field means to generate force-fields to levitate said stylus within a defined space, and a source of ionizing radiations directed toward said at least one stylus.

17. A three-dimensional video system comprising in combination: at least one stylus including a material responsive to electric force-field means to levitate said at least one stylus, at least partially coated with barium salt; electric force-field means to generate force-fields to levitate said stylus within a defined space, and a source of X-rays directed toward said at least one stylus.

18. A three-dimensional video system comprising in combination: a plurality of styli, said styli, each provided with a radiating material causing it to give off light in response to a cooperative beam; electric force field means to suspend the styli spaced from each other within a space defined within the limits of the field of said force means; and means to expose said styli to said cooperative beams.

19. A three-dimensional video system as claimed in claim 18, said styli having a size of about from between 2 to about 1,000 angstroms.

20. A three-dimensional video system as claimed in claim 18, said styli having micro-dimensional sizes.

21. A three-dimensional video system as claimed in claim 12, said at least one stylus having a micro-dimensional size.

22. A three-dimensional video system as claimed in claim 12, said at least one stylus having a size at least equal to the size of one molecule of said material.

23. A three-dimensional video system comprising in combination: a stylus including a material responsive to electric field-force means to levitate and a radiation material capable to give off light in response to a cooperative excitation means; at least one first and one second electric force-field means for generating variable magnitude force fields to levitate and move said stylus in at least one plane within a space defined by the field of said electric force means, means to vary the magnitudes of said force fields to control the movements of said stylus; and excitation means to cause said radiating material to give off light.

24. A three-dimensional video system as claimed in claim 23 further including means to detect the positions of said stylus.

25. A three-dimensional video system comprising in combination: at least one stylus including a material responsive to electric force-field means to levitate and to move and a radiating material capable to give off light in response to a cooperative excitation; a first, a second and a third force-field means capable of generating mutually perpendicular variable magnitude force fields, said stylus inserted for free levitation and movements within the space defined by said force fields, means for varying the magnitudes of the respective said force-fields to control the movements of said stylus within said space, and at least one excitation means to cause said stylus to give off light.

26. A three-dimensional video system as claimed in claim 12, said space defined by a container having at least one inspection window.

27. A three-dimensional video system as claimed in claim 12, said space defined by an evacuated container, having at least one inspection window.

28. A three-dimensional video system as claimed in claim 12, said space defined by a container, having at least one inspection window, said container filled with a transparent damping fluid.

29. A three-dimensional video system as claimed in claim 12, said space defined by a container having at least one inspection window, said means to cause said stylus to give off light, comprising a stylus material selected to give off light on contact with a cooperative fluid and said cooperative fluid filling said container.

30. A three-dimensional video system as claimed in claim 29, said stylus material selected to give off light being a fluorescent material and said fluid being selected from a group of fluids consisting of neon, argon, hydrogen, sulphide, krypton, mercury and a phosphorus in powdered form.

31. A three-dimensional video system as claimed in claim 12, said space defined by a container having at least one inspection window, said excitation means causing said stylus to give off light comprising a polynuclear aromatic hydrocarbon which emits light when exposed to an ionizing radiation in a liquid carrier, containing a liquid hydrocarbon solvent; said hydrocarbon coated on the surface of said stylus, said container filled with said hydrocarbon solvent, and a source of ionizing radiation directed into said container.

32. A three-dimensional video system comprising in combination: electric means capable of generating a plurality of variable force fields, a container within said force fields, said container having at least one inspection window, a stylus within said container, said stylus comprising material responsive to said force fields, to be moved therein; means to detect the movements of said stylus, means to cause said stylus to give off light during its movements, and means to cause the generation of said force fields.

33. A three-dimensional video system as claimed in claim 32, said electric means comprising means to move said stylus in a sequence of linear paths within at least one plane.

34. A three-dimensional video system as claimed in claim 32, said electric means comprising means to move said stylus in a sequence of linear paths within a sequence of a plurality of planes.

35. A three-dimensional tele-video recorder for creating transient images having a depth dimension in addition to height and width, comprising in combination a display container, a solid electric force-field responsive stylus-particle positioned for controlled movements within said container, electric force-field means operable to controllably suspend and move said solid stylus within said container, said stylus coated for transient radiations in response to electron impingements, a cathode day electron gun with electron emission means and scanning means and means actuating said gun to cause impingement of electrons upon said stylus.

36. A three-dimensional video apparatus comprising in combination a container having at least one inspection window, at least one body positioned for free movements within said container, said body including means responsive to electrical energy fields to move therein, electrical energy means for producing variable fields effective on said body to move the same in and along a sequence of paths, said container positioned within said electrical energy fields, means to variably actuate and control said electrical energy means, said body including materials responsive to radiations to give off light, means to variably actuate and control said radiations.

37. A three-dimensional television comprising a container having at least one transparent window, a stylus within said container coated to emit light in response to an electron beam, means to move said stylus within said container universely in a sequence of a plurality of planes and of a plurality of lines, at least one electron beam source and means to follow said stylus as it moves, by electron beams from said source.

38. A three-dimensional television comprising a container having at least one transparent window, a plurality of styli coated to emit light in response to an electron beam, and suspended spaced within said container, at least one source of electron beams and means to direct said source to variably impinge electron beams on said styli.

39. A three-dimensional television as claimed in claim 37 said at least one electron beam source being a plurality of sources, each spaced from the others in a coordinate system to impinge electron beams on the moving stylus from a different coordinate direction.

References Cited by the Examiner

UNITED STATES PATENTS

| | | | |
|---|---|---|---|
| 1,595,801 | 8/1926 | McDonald | 197—189 |
| 2,027,530 | 1/1936 | Hammond | 343—112 |
| 2,361,390 | 10/1944 | Ferrill | 343—7.9 |
| 2,604,607 | 7/1952 | Howell | 343—17 |
| 2,762,031 | 9/1956 | Fryklund | 343—7.9 |
| 2,866,191 | 12/1958 | McFall et al. | 343—11 |
| 2,911,538 | 11/1959 | Munz | 250—204 |
| 3,005,196 | 11/1961 | Aiken | 343—7.9 |

OTHER REFERENCES

Ridenour: "Radar Systems Engineering," vol. 1, MIT Radiation Laboratory Series, published 1947, McGraw-Hill Book Co., pages 626–655.

CHESTER L. JUSTUS, *Primary Examiner.*

FREDERICK M. STRADER, *Examiner.*

R. A. KUYPERS, G. J. MOSSINGHOFF, L. J. MARHOEFER, R. E. BERGER, *Assistant Examiners.*